(12) United States Patent
Cronk et al.

(10) Patent No.: US 8,966,817 B2
(45) Date of Patent: Mar. 3, 2015

(54) MODULAR LIVING ROOF SYSTEM

(75) Inventors: Erik E. Cronk, Flushing, MI (US);
Jeremiah D. Johnson, Muskegon, MI (US); Bruce A. Sienkowski, Ada, MI (US); William T. Oltman, Grand Rapids, MI (US)

(73) Assignee: Advanced Green Architecture, Grand Rapids, MI (US)

( * ) Notice: Subject to any disclaimer, the term of this patent is extended or adjusted under 35 U.S.C. 154(b) by 896 days.

(21) Appl. No.: 13/115,248

(22) Filed: May 25, 2011

(65) Prior Publication Data

US 2011/0289839 A1    Dec. 1, 2011

Related U.S. Application Data

(60) Provisional application No. 61/348,023, filed on May 25, 2010.

(51) Int. Cl.
*A01G 1/00* (2006.01)
*A01G 9/02* (2006.01)

(52) U.S. Cl.
CPC .............. *A01G 1/007* (2013.01); *A01G 9/025* (2013.01)
USPC ...................... 47/81; 47/65.5; 47/66.1; 47/85

(58) Field of Classification Search
USPC ................... 47/65.7, 65.9, 81, 39, 65.5, 66.1
See application file for complete search history.

(56) References Cited

U.S. PATENT DOCUMENTS

| | | |
|---|---|---|
| 1,557,712 A | 10/1925 | Little |
| 2,279,735 A * | 4/1942 | Gates .............................. 47/33 |
| 2,827,217 A | 3/1958 | Clement |
| 2,949,699 A | 8/1960 | Lapetina et al. |
| 3,651,976 A | 3/1972 | Chadbourne |
| 3,772,827 A | 11/1973 | Ware |
| 3,797,738 A | 3/1974 | Fitzhugh |
| 4,058,930 A | 11/1977 | Miles |
| 4,276,720 A | 7/1981 | Lyon |
| 4,829,709 A | 5/1989 | Centafanti |
| 4,837,973 A | 6/1989 | Snekkenes |
| 5,050,343 A | 9/1991 | Henttonen |
| 5,187,894 A | 2/1993 | Ripley, Sr. et al. |
| 5,189,834 A | 3/1993 | Green |
| 5,309,846 A | 5/1994 | Peterson |
| 5,390,442 A | 2/1995 | Behrens |
| 5,419,080 A | 5/1995 | Buss et al. |
| 5,480,494 A | 1/1996 | Inoue |

(Continued)

FOREIGN PATENT DOCUMENTS

WO    2004075628    9/2004

*Primary Examiner* — Monica Williams
(74) *Attorney, Agent, or Firm* — Warner Norcross & Judd LLP

(57) ABSTRACT

A modular green roof and/or green wall system includes a plurality of trays adapted to support vegetation and soil therein. The trays are sized such that a person may easily lift them and install them in a pre-vegetated state upon a roof or a wall. The trays are further designed to enable subterranean irrigation lines to be inserted therethrough, thereby hiding the irrigation lines from view. Biodegradable walls may be added of different heights to the trays to support different types of vegetation, as well as to create terracing for a given installation, if desired. A wicking material may be inserted into the tray and positioned such that is makes contact with wicking material in adjacent trays, thereby spreading moisture between trays through the capillary action of the wicking material.

18 Claims, 16 Drawing Sheets

(56) References Cited

U.S. PATENT DOCUMENTS

| | | | |
|---|---|---|---|
| 5,675,933 A | 10/1997 | Kawaguchi et al. | |
| 5,953,859 A | 9/1999 | Cochran et al. | |
| 5,983,561 A | 11/1999 | Behrens | |
| 6,079,156 A | 6/2000 | Colovic | |
| 6,178,690 B1 * | 1/2001 | Yoshida et al. | 47/65.9 |
| 6,237,285 B1 | 5/2001 | Yoshida et al. | |
| 6,397,520 B1 | 6/2002 | Kosinski | |
| 6,536,361 B1 | 3/2003 | Wu | |
| 6,606,823 B1 | 8/2003 | McDonough et al. | |
| 6,694,672 B1 | 2/2004 | Hergeth | |
| 6,711,851 B2 | 3/2004 | Mischo | |
| 6,739,089 B1 | 5/2004 | Behrens | |
| 6,851,221 B2 | 2/2005 | Layt et al. | |
| 6,862,842 B2 | 3/2005 | Mischo | |
| 6,904,716 B2 | 6/2005 | Weder et al. | |
| 6,938,790 B2 | 9/2005 | Hughes | |
| 7,018,134 B2 | 3/2006 | Sowry et al. | |
| 7,273,642 B2 | 9/2007 | Prevost | |
| 7,387,823 B2 | 6/2008 | Waterford | |
| 7,392,616 B1 | 7/2008 | Bagby | |
| 7,407,340 B2 | 8/2008 | Byles | |
| 7,596,906 B2 | 10/2009 | Gold | |
| 7,603,808 B2 | 10/2009 | Carpenter et al. | |
| 7,637,056 B2 * | 12/2009 | Tajima et al. | 47/65.9 |
| 7,716,873 B2 * | 5/2010 | Irwin | 47/65.9 |
| 7,726,071 B2 | 6/2010 | Carpenter | |
| 7,788,848 B1 * | 9/2010 | Koumoudis | 47/65.9 |
| 7,805,885 B2 | 10/2010 | Luckett | |
| 7,900,397 B2 | 3/2011 | Mischo | |
| 2005/0102921 A1 | 5/2005 | Mischo | |
| 2005/0120656 A1 | 6/2005 | Luckett | |
| 2005/0229535 A1 | 10/2005 | Garner et al. | |
| 2006/0150500 A1 | 7/2006 | Behrens | |
| 2006/0242901 A1 * | 11/2006 | Casimaty et al. | 47/65.9 |
| 2007/0033871 A1 | 2/2007 | Kelly et al. | |
| 2007/0094927 A1 * | 5/2007 | Perry | 47/65.9 |
| 2007/0101646 A1 | 5/2007 | Licht | |
| 2007/0189852 A1 | 8/2007 | Wolfley | |
| 2007/0193116 A1 | 8/2007 | Luckett et al. | |
| 2007/0199241 A1 | 8/2007 | Peleszezak | |
| 2007/0283653 A1 | 12/2007 | Garner et al. | |
| 2008/0168710 A1 * | 7/2008 | MacKenzie | 47/65.9 |
| 2008/0236041 A1 * | 10/2008 | Carpenter | 47/65.9 |
| 2009/0260284 A1 | 10/2009 | Barbalho | |
| 2009/0320364 A1 | 12/2009 | MacKenzie | |
| 2010/0107489 A1 * | 5/2010 | Silver | 47/39 |
| 2010/0162623 A1 * | 7/2010 | Mathy | 47/65.9 |

* cited by examiner

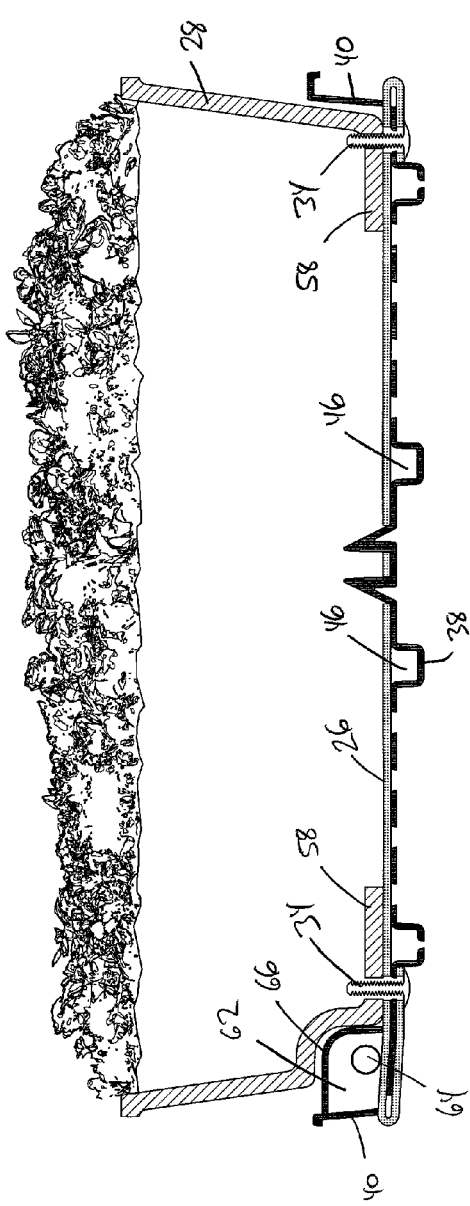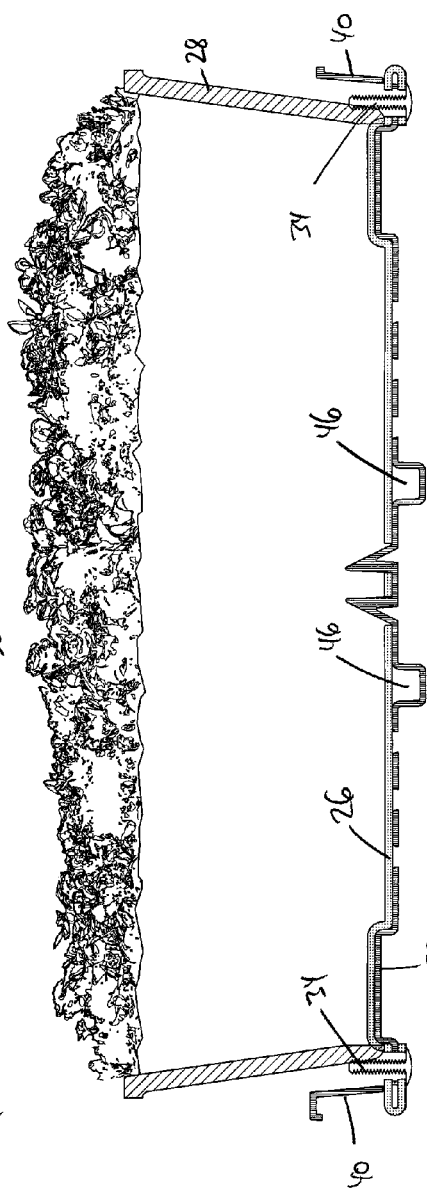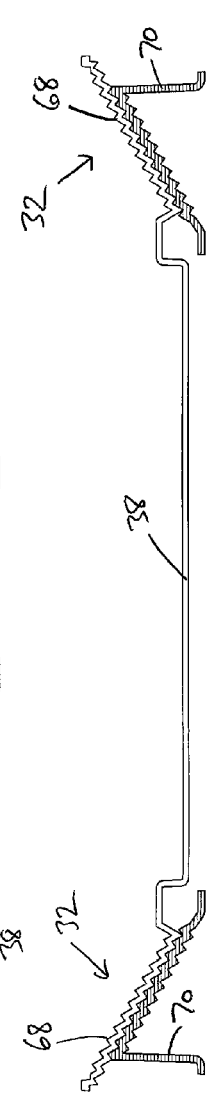

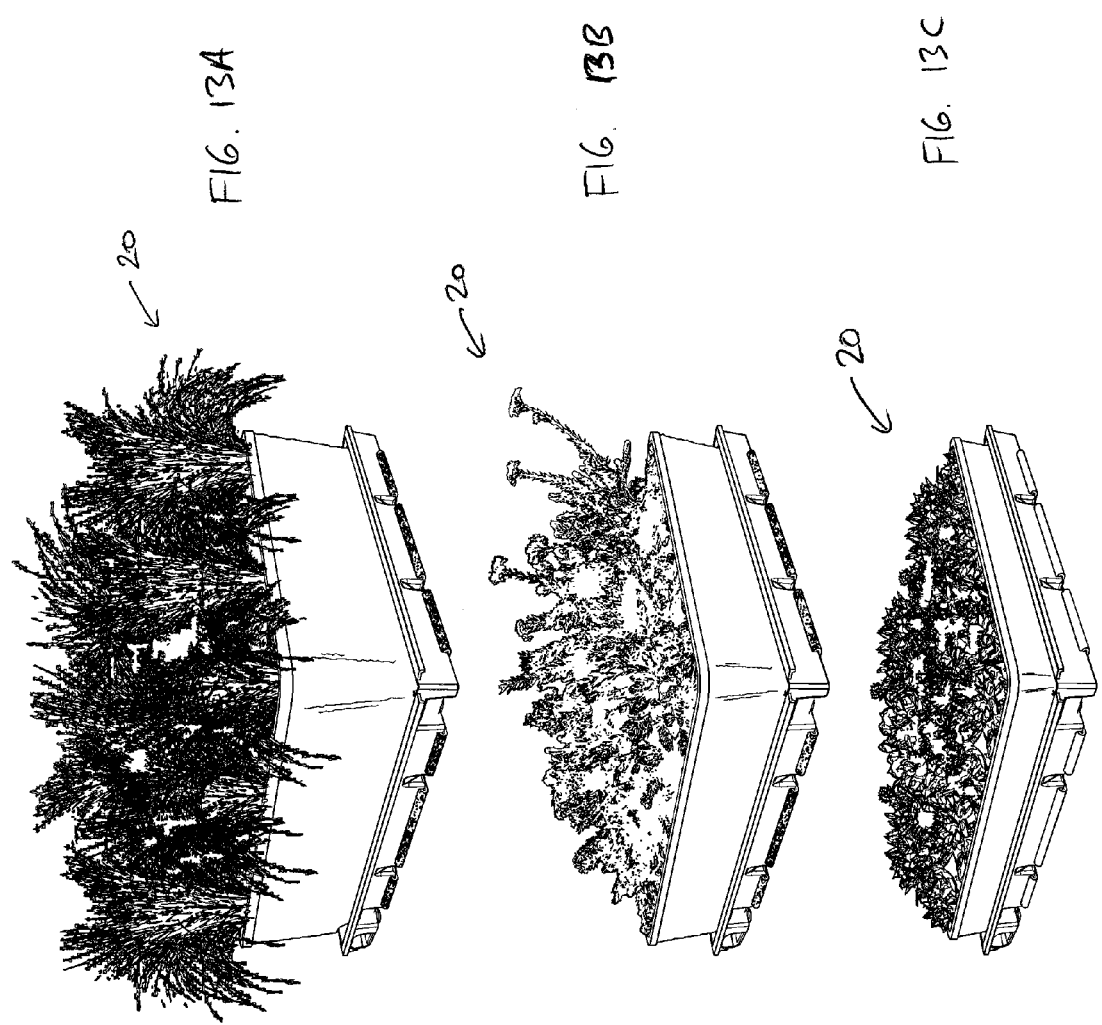

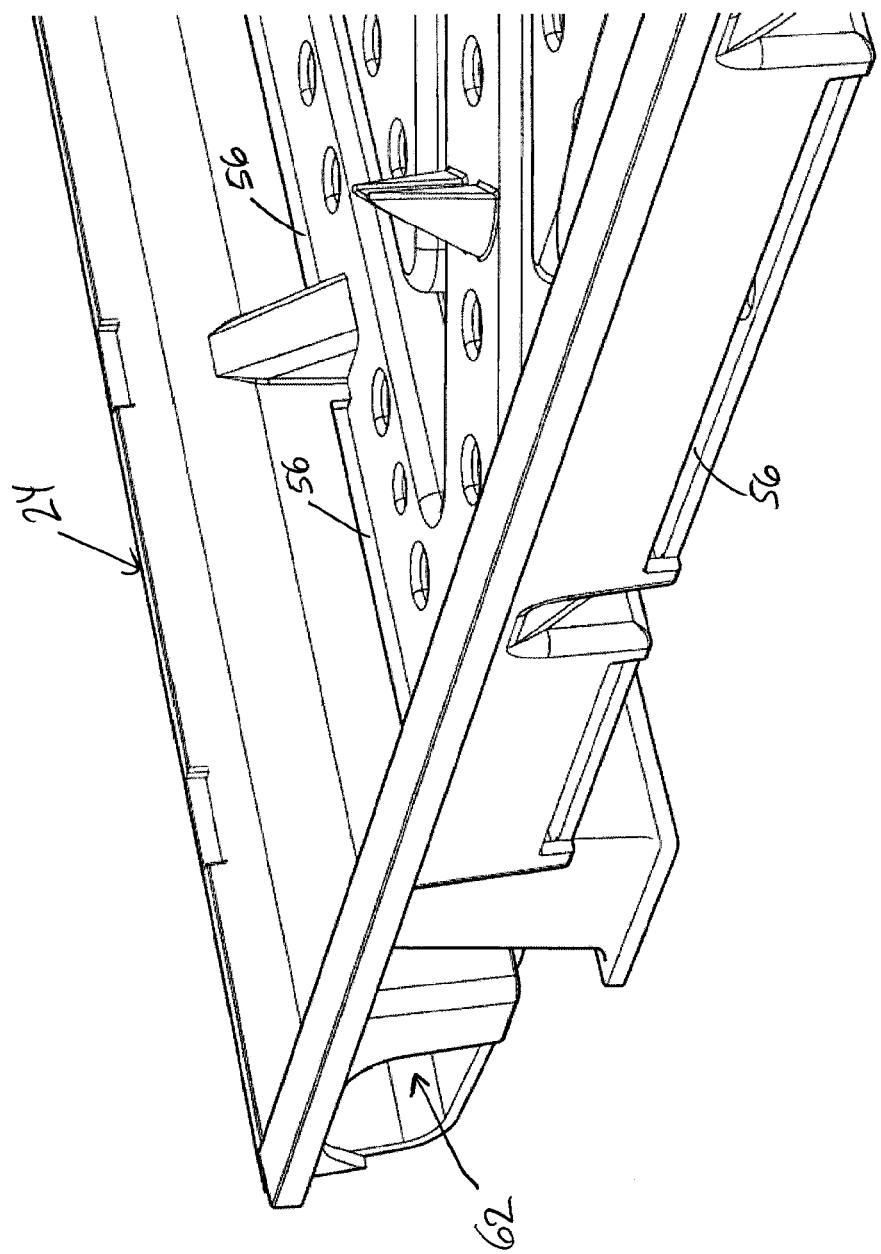

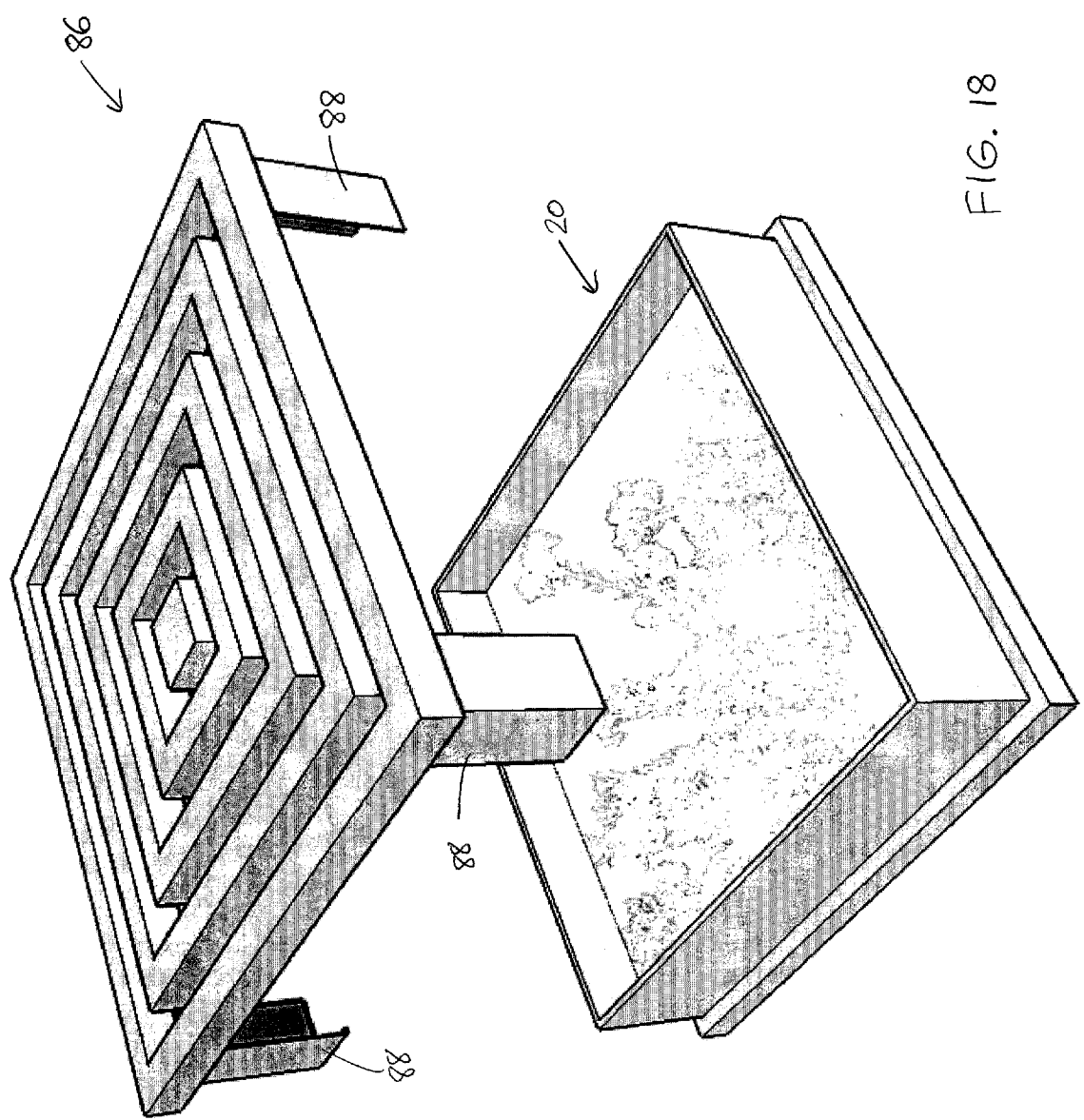

MODULAR LIVING ROOF SYSTEM

CROSS-REFERENCE TO RELATED APPLICATIONS

This application claims priority to U.S. provisional patent application Ser. No. 61/348,023 filed May 25, 2010 entitled Modular Living Roof System, the complete disclosure of which is hereby incorporated herein by reference.

BACKGROUND OF THE INVENTION

The present invention relates to roofs and walls that are adapted to sustain and support living plant matter thereon, and more specifically to a modular system that can be assembled on a roof or wall.

Green roofs and green walls are structures on which living plants grow. Green roofs and green walls are becoming more and more popular in recent times, both for their aesthetic qualities, as well as the multiple environmental benefits that come from their use. Existing green roof and green wall technology, however, can be expensive to purchase and labor-intensive to install.

SUMMARY OF THE INVENTION

The present invention relates to an improved green roof or green wall system that is easy to install and economical to incorporate onto existing roofs, walls, or other structures. In one embodiment, an interlocking modular green roof and green wall system with an integrated subsurface irrigation system may be provided. The module is designed for application on flat and sloped roof surfaces as well as vertical walls. The basic components of the module or unit include a plastic tray, a bio-degradable wall, a sub-surface irrigation system and an erosion control device. The green roof system is designed to be installed in a grid like pattern. An integrated irrigation channel allows irrigation drip lines to be run through the connected irrigation channels allowing water to transfer to/from adjacent modules through the integration of capillary mat connection methods. The side walls allow for varying heights to enable deeper media and therefore a wider range of plant species. Drainage holes may be built into the bottom of the plastic tray which allow water to drain out of the module directly onto a waterproof membrane positioned on top of the roof and underneath the modular green roof system. Slope stabilization may optionally be applied on sloped roofs and helps stabilize soil/media and therefore prevent erosion.

According to another embodiment, a modular green roof apparatus is provided that includes a tray, an irrigation channel, a wicking mat, and an aperture defined in a sidewall of the tray. The tray includes a bottom and a plurality of sidewalls extending upwardly from the bottom. The tray is adapted to support soil in which plants may grow. The irrigation channel extends from a first one of the sidewalls to another one of the sidewalls and is positioned above the bottom. The channel includes an opening through which water may travel, either by itself or via the wicking material, or through a combination of both. The wicking mat is positioned above the tray such that water onto the wicking mat. The aperture in the sidewall of the tray is positioned to enable the wicking mat to extend therethrough such that the wicking mat may be placed in physical contact with a second wicking mat from a neighboring tray in order to allow the wicking mat and the second wicking mat to transfer water.

According to another embodiment, a green roof system is provided that includes a set of modular green roof apparatuses, such as those described above, that include a trays, irrigation channels, wicking mats, and apertures. The system further includes an irrigation hose extending through at least some of the set of modular green roof apparatuses, but not all of the set of modular green roof apparatuses. The irrigation hose supplies water for plants growing in the green roof apparatuses.

According to yet another embodiment, a modular green roof apparatus is provided that includes a tray and a plurality of adjustable leveling structures. The tray includes a bottom and a plurality of sidewalls extending upwardly from the bottom. The tray is adapted to support soil in which plants may grow. The adjustable leveling structures allow an angular orientation of the bottom of the tray to be adjusted with respect to an underlying roof structure. The leveling structures can thereby accommodate uneven sections of roof and/or enable an installer to install a green roof tray at an angle other than the angle of the plane defined by the underlying roof.

According to yet another embodiment, a modular green roof apparatus may be provided that includes a tray and at least one planar erosion control member. The tray includes a bottom and a plurality of sidewalls extending upwardly from the bottom. The tray is adapted to support soil in which plants may grow. The erosion control member includes a plurality of apertures defined therein and is adapted to be inserted into the tray to resist erosion of soil positioned within the tray while still allowing water to travel through the planar erosion control member.

According to other embodiments, a biodegradable wall or wall extension may be provided that sits in the tray. The biodegradable wall extends upwardly from the bottom of the tray a greater extent than the sidewalls and enable greater volumes of soil to be supported by the tray than the volume defined by the tray itself. The biodegradable wall may include four walls sections having a perimeter shaped substantially the same as a perimeter defined by the plurality of sidewalls. The biodegradable wall may include a flat section that seats in the tray and which will be covered by soil when the tray is filled with soil.

The adjustable leveling structures may include at least one threaded support and at least one threaded aperture defined in the tray and adapted to receive the threaded support, whereby the threaded support may be rotated within the threaded aperture to changes a distance between a bottom of the threaded support and the bottom. Alternatively, the adjustable leveling structures may include a toothed area defined in the tray and a physically separable support having a toothed surface adapted to engage the toothed area in a plurality of different positions, wherein the different positions define different heights for the tray.

One or more of the trays may further include at least one planar erosion control member having a plurality of apertures defined therein, the planar erosion control member adapted to be inserted into the tray and to resist erosion of soil positioned within the tray while still allowing water to travel through the planar erosion control member. The planar members may extend from a first corner of the tray to a second corner of the tray. Multiple planar members may be positioned within a single tray and arranged in a criss-cross configuration.

In still other embodiments, a hook may be included on at least one sidewall whereby the hook hooks onto a second tray positioned next to the tray to thereby releasably secure the tray and the second tray together. Some of the sidewalls may further include an irrigation channel opening that is sized and positioned to align with the irrigation channel within the tray, whereby an irrigation hose may be inserted through the sidewall via the irrigation channel opening and into the irrigation channel. The irrigation channels are adapted to allow a hose to be positioned therein such that the hose may provide subterranean irrigation to soil positioned within the tray. A pair of indentations may be defined on a bottom side of the bottom to facilitate grasping of the tray by human hands. Apertures may be defined in all of the sidewalls to enable the wicking mat to extend therethrough such that the wicking mat may be placed in physical contact with multiple adjacent wicking mats from multiple adjacent trays in order to allow the multiple wicking mats to hydraulically communicate.

Modular grating units may also be placed over any one or more of the modular trays. Such modular grating units may include spaces for plant life to grow therethrough and/or for water and/or sunlight to pass through. The grating units, however, include sufficient structure to enable a person to walk thereon, or for other objects to be placed thereon. The modular grating units may therefore enable certain sections of a roof to be designated for walking, standing, or for other purposes, whereby the weight of the person(s) on the grated areas is borne by the grating, not by the modular trays and/or bio walls.

BRIEF DESCRIPTION OF THE DRAWINGS

FIG. 8 is a cross-sectional view of the tray, wall, and plant material of the unit of FIG. 5 taken generally midway into the tray and running from a first side to a second side;

FIG. 9 is a cross-sectional view similar to FIG. 8 but taken along a plane perpendicular to the plane along which the view of FIG. 8 is taken;

FIG. 10 is a cross-sectional view of the tray and adjustable leveling mechanisms;

FIGS. 13A, 13B, and 13C are perspective views of the trays and walls of FIGS. 12A, 12B, and 12C shown with plants growing therein;

FIG. 17 is a close-up view of a portion of the tray of FIG. 2; and

FIG. 18 is a perspective view of a grating unit that may be placed over the top of the modular units.

DETAILED DESCRIPTION OF THE EMBODIMENTS

Figure 1:
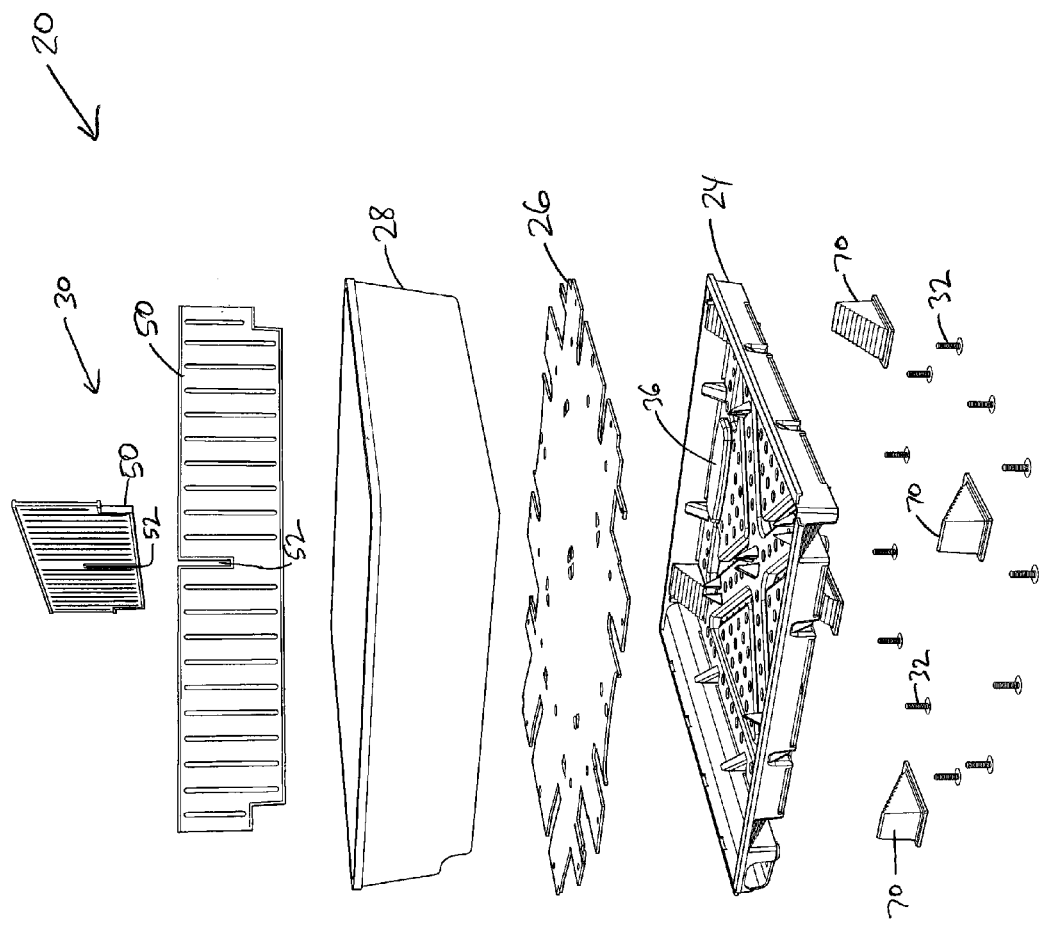
FIG. 1 is an exploded, perspective view of one embodiment of a modular green roof unit that includes a tray, a biodegradable wall, erosion control members; fasteners, height adjustment structures, and a wicking material.
Figure 14:
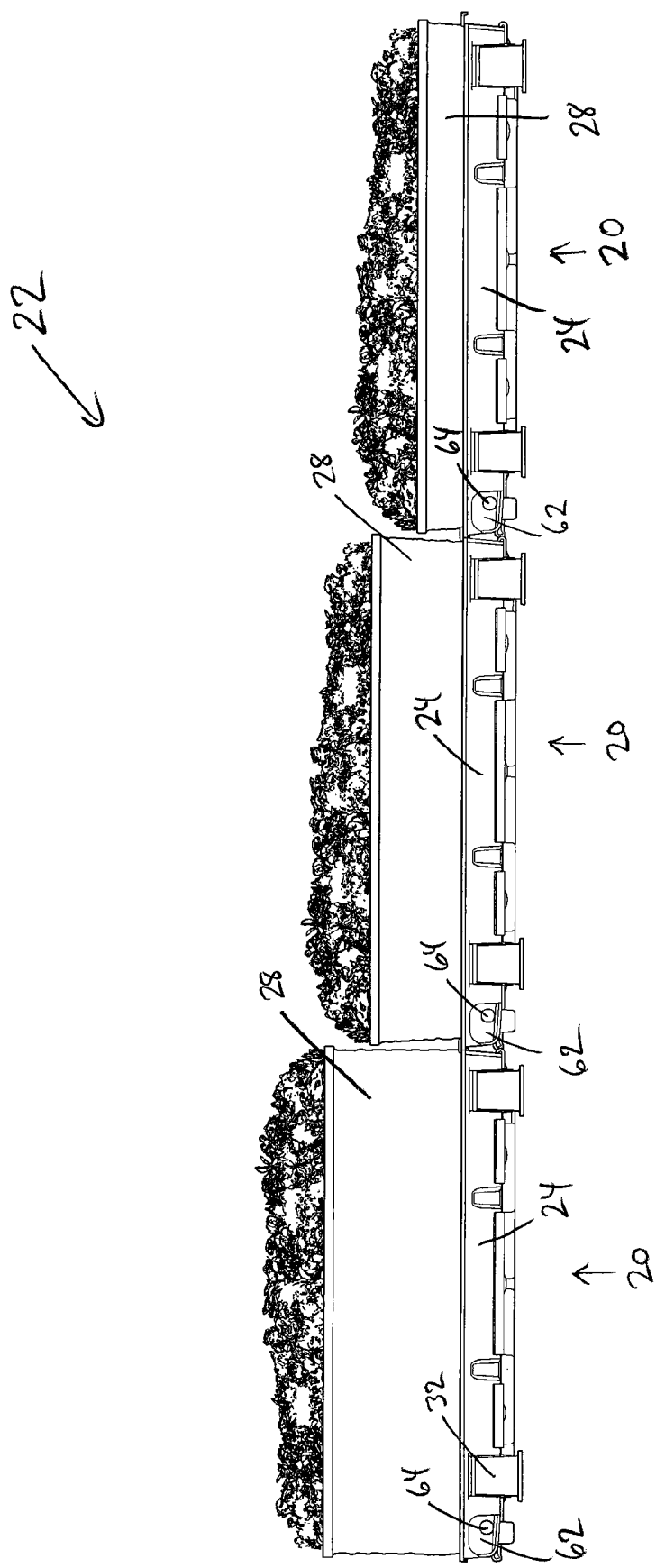
FIG. 14 is a side, elevational view of three trays hooked together having different biodegradable wall heights to thereby created tiered levels of vegetation.

A modular green roof unit 20, which may be part of a modular green roof system 22 (such as is shown in FIG. 14, or in other types of green roof systems), is depicted in an exploded, perspective view in FIG. 1. Modular unit 20 includes a tray 24, an irrigation mat 26, a biodegradable wall 28, one or more erosion control walls 30, one or more adjustable leveling devices 32, and one or more fasteners 34. With the exception of the irrigation mat 26, all of the foregoing components may be made out of plastic, or other suitable material. Any plastic of suitable durability may be used, as would be known to one of ordinary skill in the art. A plurality of the units 20 of FIG. 1, or variations thereof, are designed to be placed upon a roof, or secured to a wall, to create a green roof or a green wall. A water impermeable membrane (not shown) may be placed over the roof prior to the installation of the modular units 20.

Tray 24 is the main component of each green roof unit 20. Tray 24 provides the structural support for supporting soil and vegetation that is to be placed on a roof or wall. That is, after biodegradable wall 28, mat 26, and the soil and plant matter contained within the wall 28 are placed on top of tray 24, the entire unit may be lifted by a person grasping onto tray 24. Indeed, to facilitate this lifting, tray 24 may include a pair of handles 36 defined on its underside which may receive a person's fingers for lifting. Plant matter may therefore be grown in a plurality of individual units 20 at a first location, such as a greenhouse, and then transported to a second location, such as a home or business, where the units 20 may be arranged in a grid-like fashion to cover the roof or one or more walls of the home or business. In this manner, an entire pre-vegetated green roof or green wall may be installed in a relatively short period of time. Further, as will be discussed in greater detail below, the green roof or green wall may be installed with subterranean irrigation built into it, thereby facilitating irrigation without the aesthetic unpleasantness of visually exposed irrigation lines. The use of subterranean irrigation is facilitated by the design of trays 24, as will be discussed in greater detail below.

Figure 2:
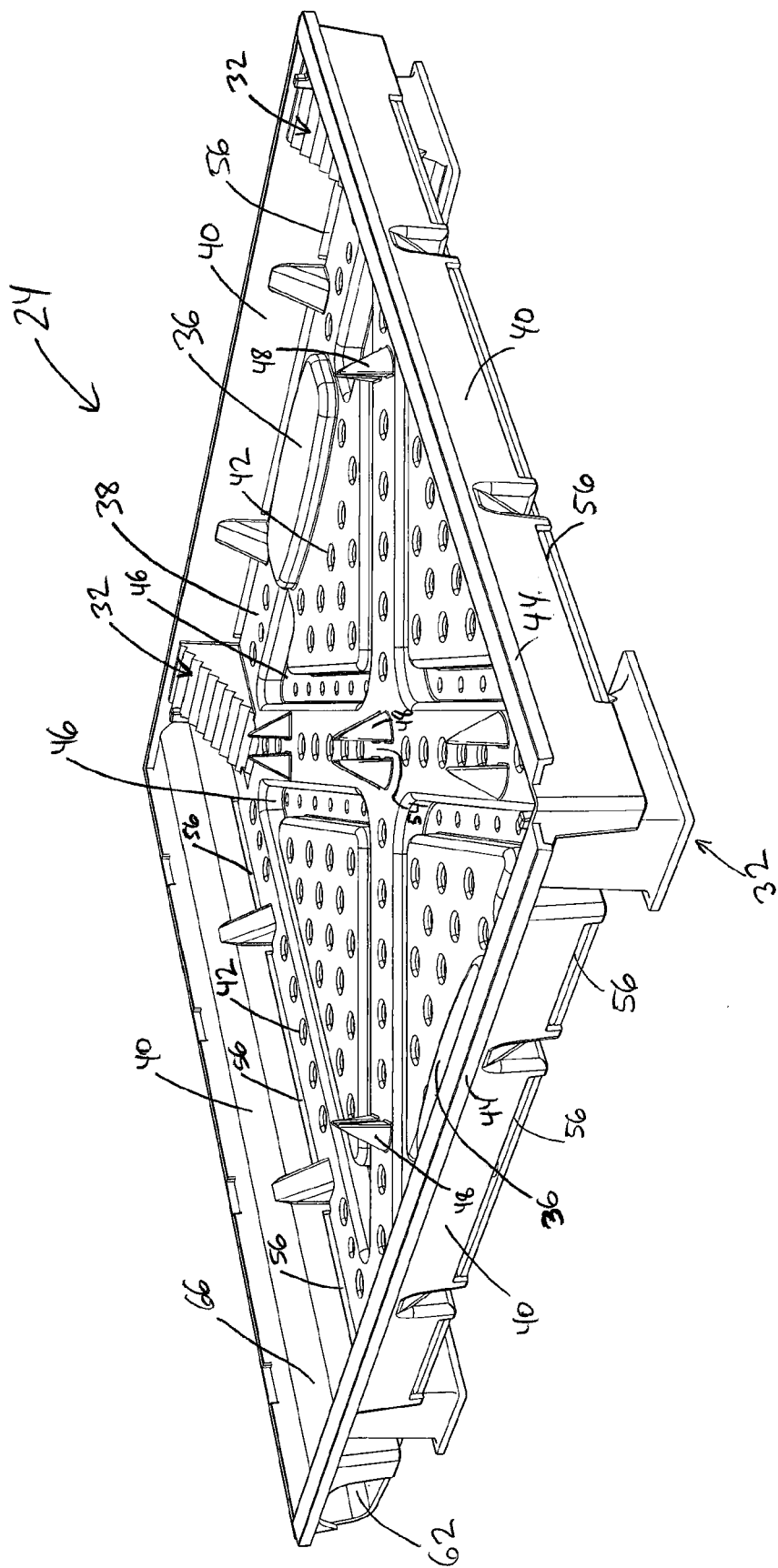
FIG. 2 is perspective view of the tray of FIG. 1.
Figure 15:
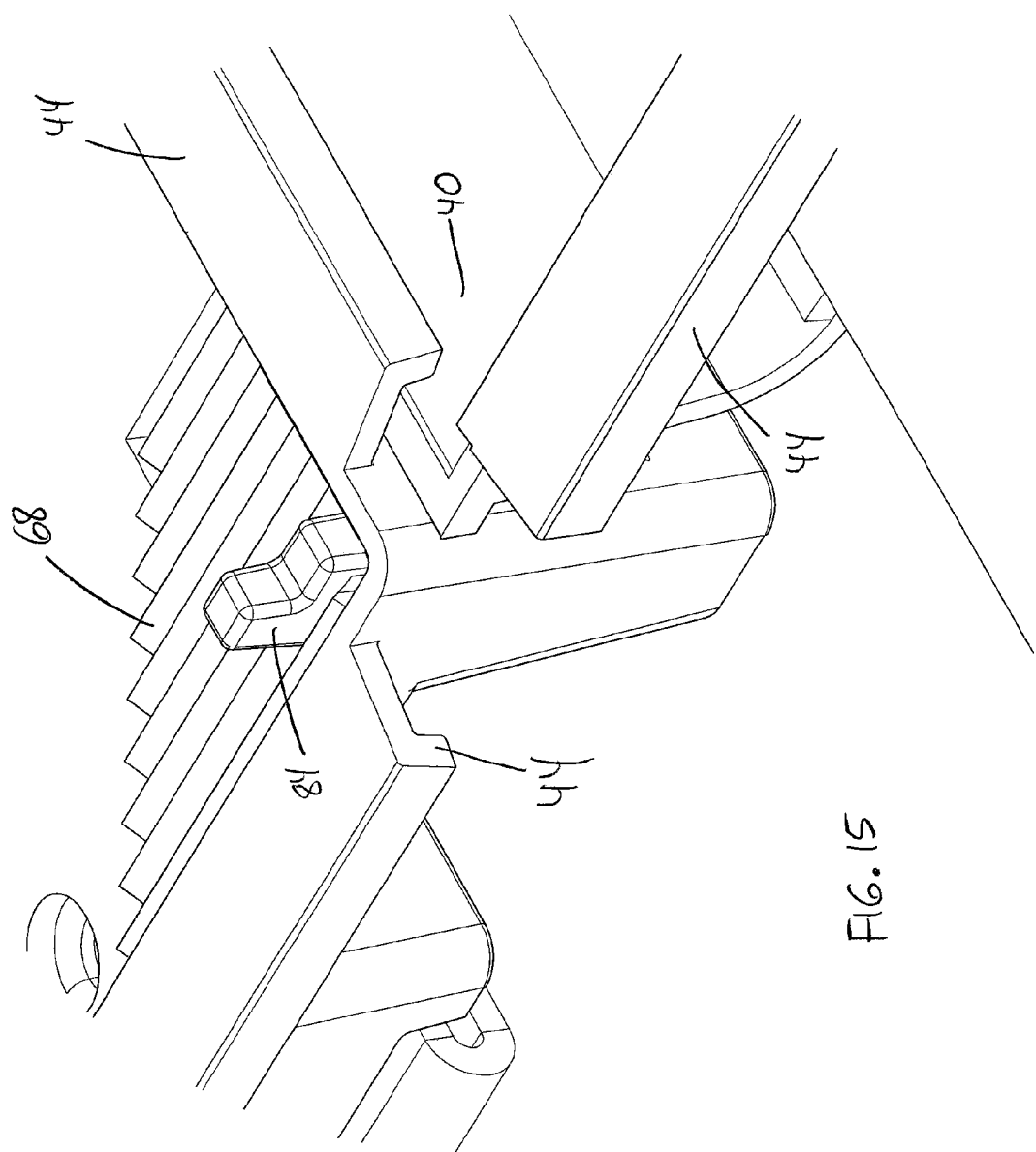
FIG. 15 is a close-up, perspective view illustrating one manner in which multiple trays may be hooked to each other.
Figure 16:
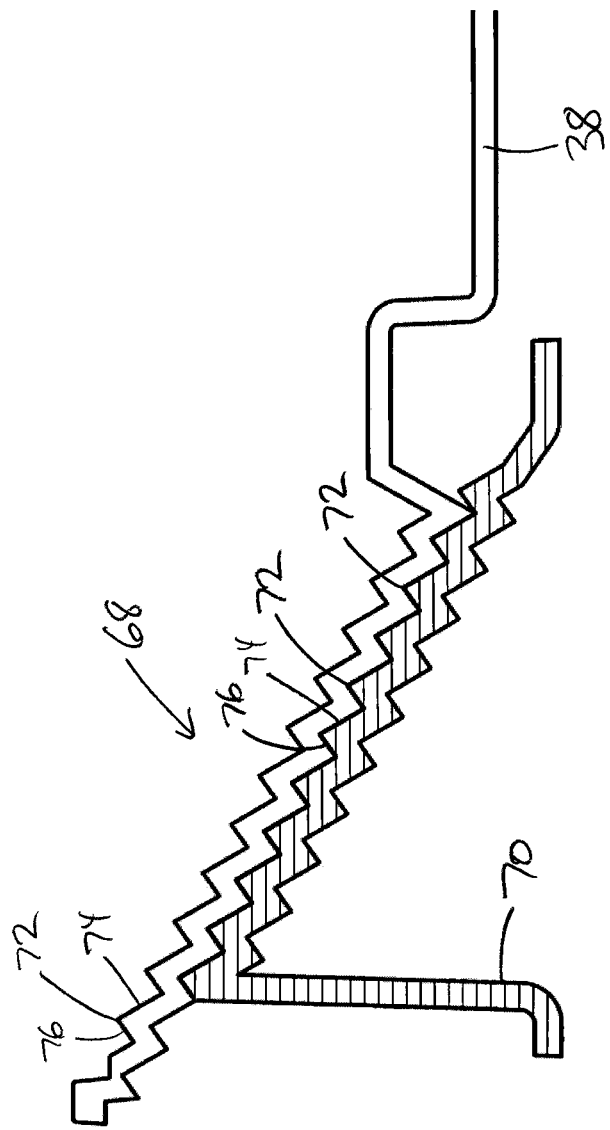
FIG. 16 is an enlarged, cross-sectional view of one of the adjustable leveling mechanisms.

FIG. 2 illustrates in greater detail the design of one embodiment of tray 24. As shown, tray 24 includes a bottom wall 38 and a plurality of side walls 40 that are generally arranged to define a square (when viewed from above). A plurality of drainage holes 42 may be defined in bottom wall 38 to allow excess water to drain therethrough, as well as to allow aeration of the soil or other media in which the plants may be growing. In the embodiment shown in FIG. 2, two of the side walls 40 include a hook 44 that is dimensioned to fit over a non-hooked side wall 40 of an adjacent tray 24. FIG. 15 illustrates in greater detail how a hook 44 of a first tray 24 fits over the top edge of a non-hooked side wall 40 of an adjacent second tray. Hooks 44 thereby provide a manner for releasably securing trays together. The hooking together of trays 24 helps prevent any separation from forming between the trays, thereby helping to avoid gaps or creases in the vegetation covering of a roof.

As shown more clearly in FIGS. 2 and 8-9, bottom wall 38 may be shaped to define a plurality of channels 46. Channels 46 serve to create a false bottom for tray 24. That is, channels 46 serve to elevate the non-channeled portions of bottom wall 38 above the roof, wall, or other structure lying underneath or adjacent the bottom side of tray 24. This elevation serves to create an air gap between the roof (or wall or other structure) and the soil of tray 24 in which the plants are growing. This air gap helps avoid undesirable contact of the soil with water that may pool on top of the water impermeable membrane (not shown) that is typically placed over the roof prior to the placement of the plurality of modular units 20. Further, this air gap can facilitate aeration of the soil in which the plant media is growing.

Figure 4:
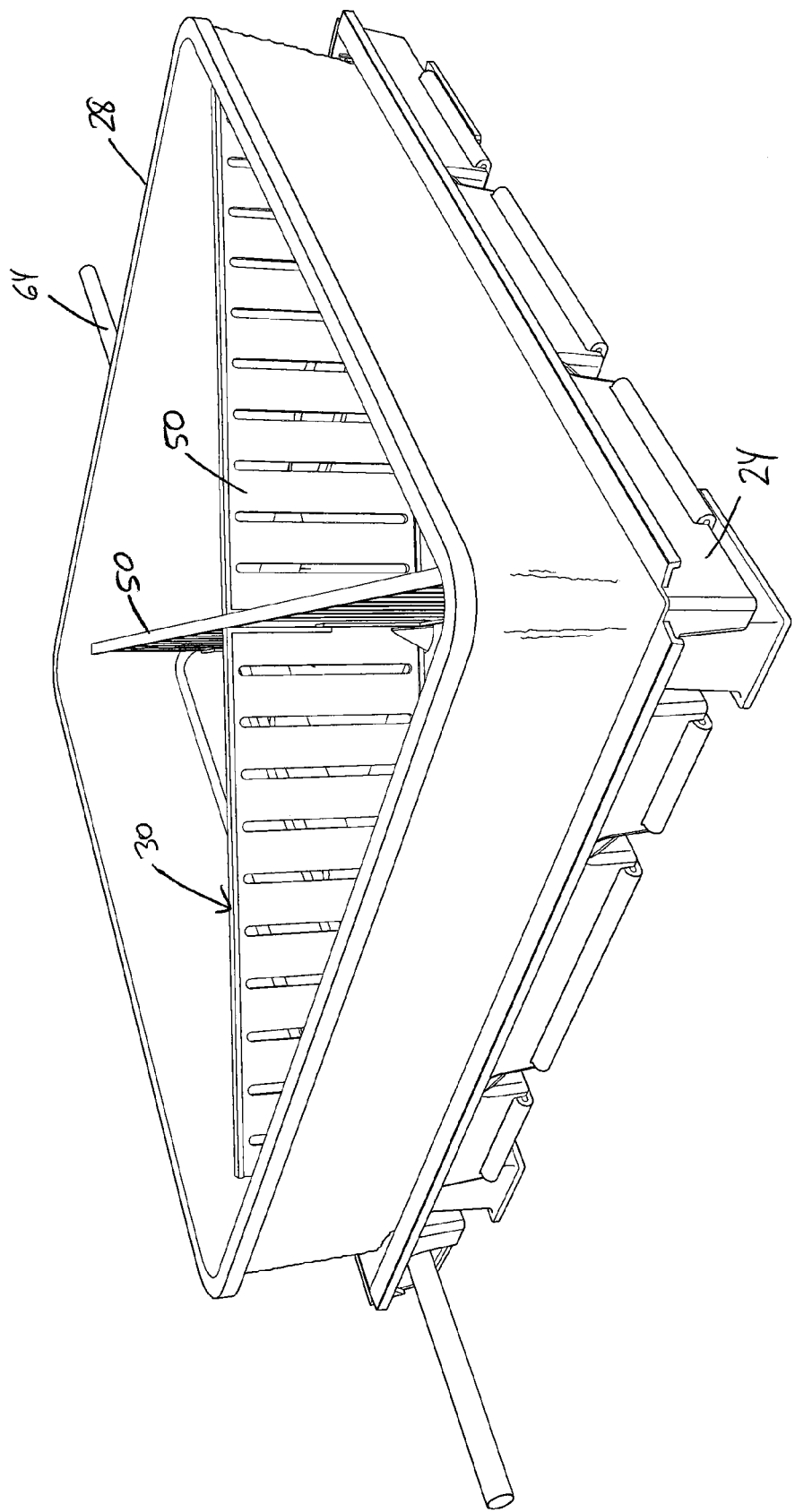
FIG. 4 is a perspective view of the tray and wall of FIG. 3 shown with the erosion control member added thereto and a portion of an irrigation hose.
Figure 6:
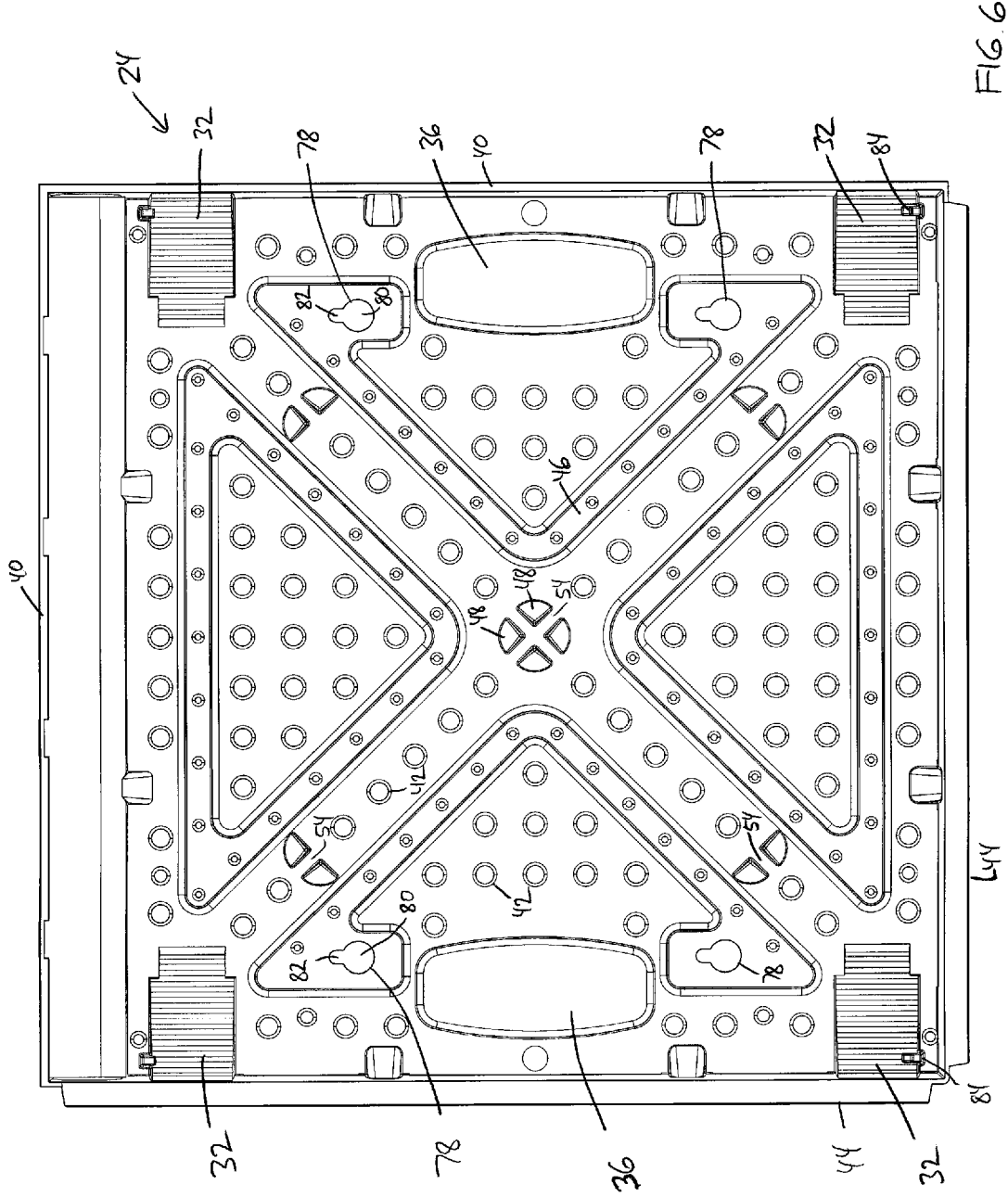
FIG. 6 is a plan view of the tray of FIG. 1.
Figure 7:
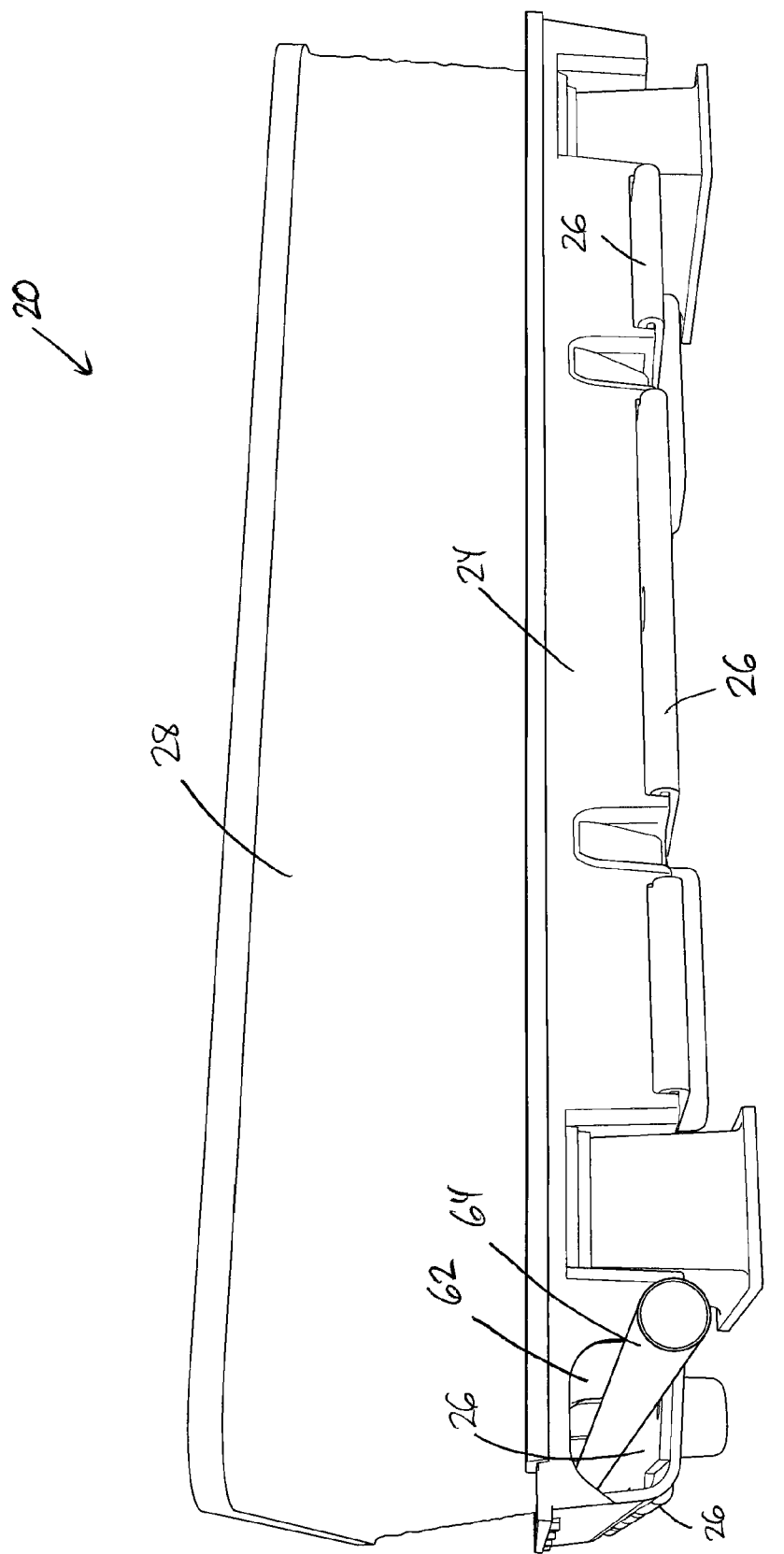
FIG. 7 is a perspective view of the tray of FIG. 1 shown with an irrigation hose or drip-line running through an irrigation channel defined within the tray.

A plurality of support prongs 48 may also be defined in, or extend out of, bottom wall 38 of tray 24, as shown in FIGS. 2 and 6. Support prongs 48 are used to help support one or more portions of erosion control unit 30. As shown in FIG. 1, erosion control unit 30 may include a pair of erosion control members or walls 50 that are designed to interlock with each other via a pair of slits 52 defined in each other. When so interlocked, walls 50 intersect each other in a criss-cross fashion. Erosion control walls 50 may be supported by support prongs 48 by being inserted into a space 54 defined between adjacent pairs of support prongs 48. (FIG. 6). As shown in FIG. 4, the walls 50 may be oriented in such a manner that, when placed inside of biodegradable wall 28, the outer ends of erosion control walls 50 are positioned adjacent each of the corners of modular unit 20. Erosion control unit 30 is designed to resist the erosive movement of the soil, or other media, in which the vegetative plant matter is growing. Each wall 50 includes a plurality of apertures through which water and/or moisture may travel so that walls 50 do not block the spread of water throughout the soil. Erosions control device 30 may be omitted from system 22 when the modular units 20 are used in an environment where erosion control is not expected to be an issue, such as on flat roofs. For roofs of significant slope, or for walls, however, erosion control device 30 may be desirable.

Figure 3:
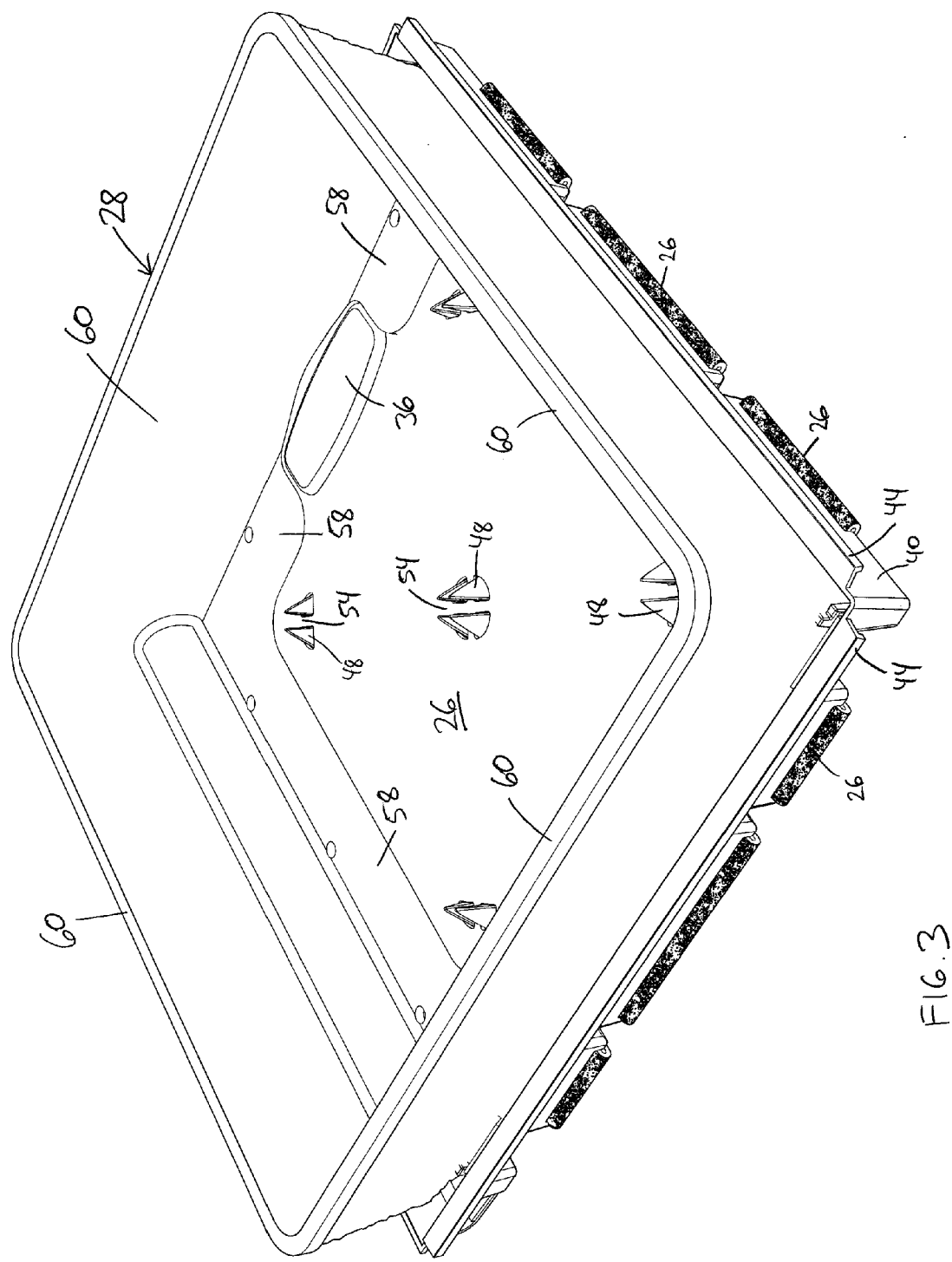
FIG. 3 is a perspective view of the tray of FIG. 1 shown with the biodegradable wall positioned therein.
Figure 5:
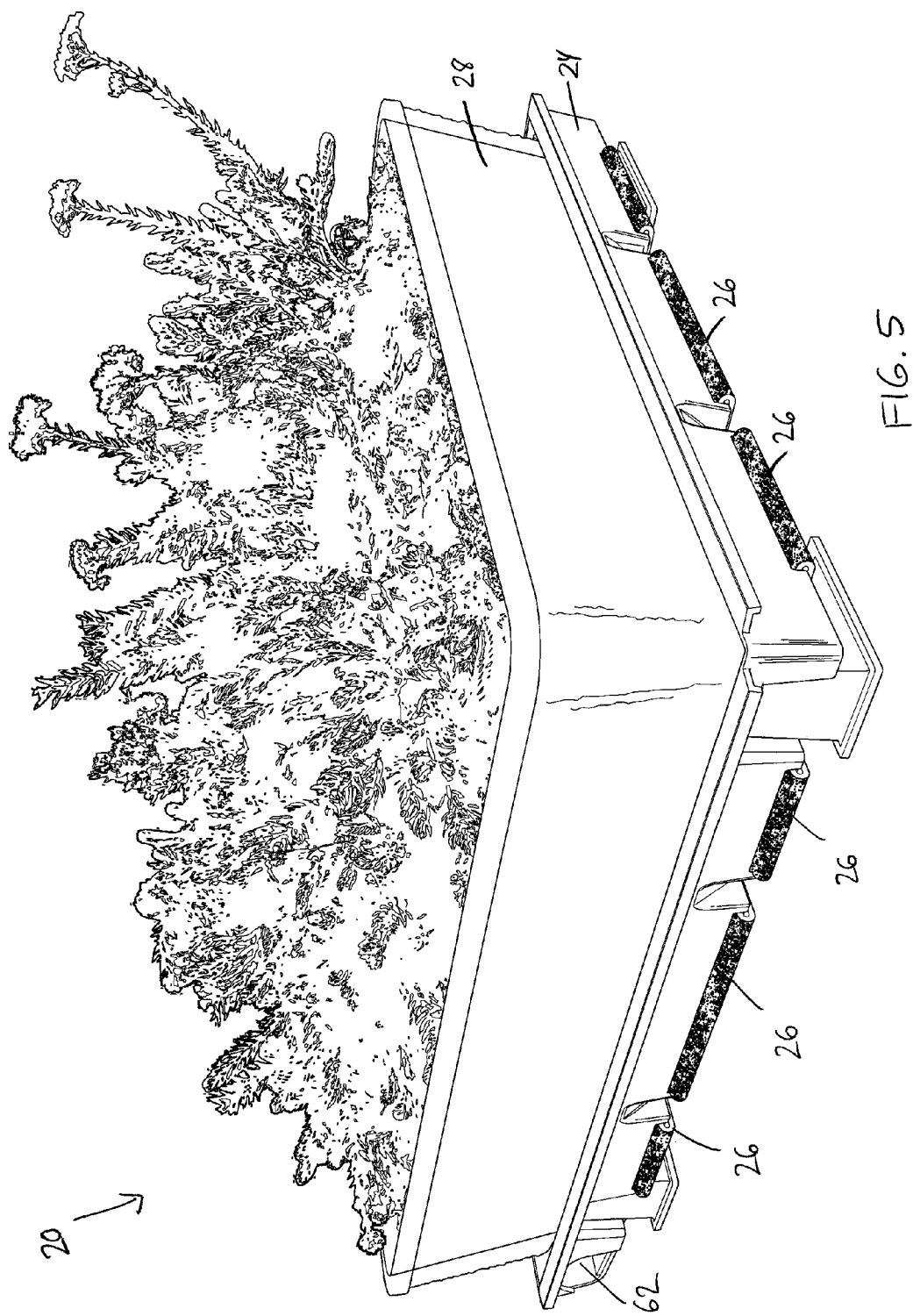
FIG. 5 is a perspective view of the tray and wall of FIG. 3 shown with soil added and plant matter growing therein.

An irrigation mat 26 may be placed on top of tray 24 in order to help facilitate the spread of moisture throughout the green roof system. Irrigation mat 26 may be made of a wicking type material that transports water or moisture through capillary action. The irrigation mat may be die-cut to fit on the bottom of tray 24. (FIG. 3) In at least one embodiment, irrigation mat 26 is folded over along the bottom region of one or more side walls 40 and fastened in this configuration by fasteners 34 that are fastened to the bottom of tray 24. (FIGS. 4, 5, and/or 14). When abutting modules 20 are connected in the grid system, the folded over regions of irrigation mats 26 form a connection (touching) allowing moisture to transfer from module to module (FIG. 14). As shown in FIGS. 3-5, the exposed ends of irrigation mat 26 (i.e. those portions outside of side walls 40) may be secured in the folded orientation so that mat 26 may more easily abut against a neighboring mat 26 of a neighboring tray 24. The physical contact between mats 26 of different trays 24 enables the mats to hydraulically communicate—that is, transfer moisture to or from each other through capillary action, or other water transfer mechanisms.

Figure 12A:
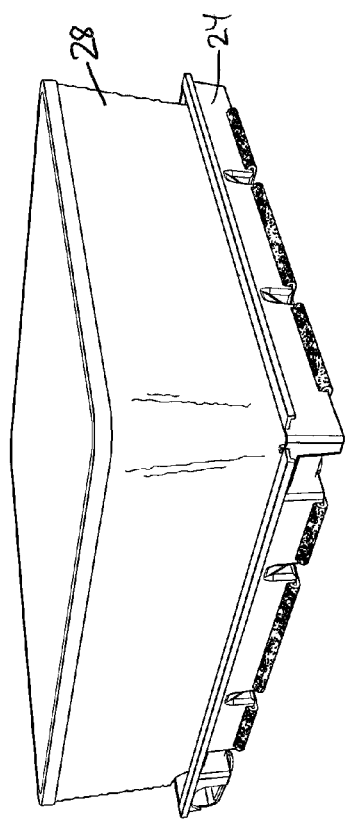
FIGS. 12A, 12B, and 12C are perspective views of trays with biodegradable walls of three different heights.
Figure 12B:
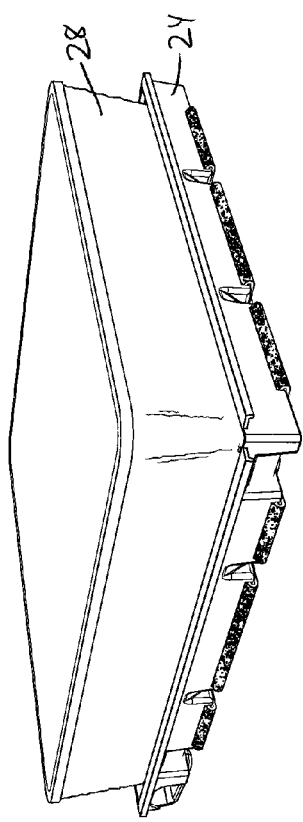
Figure 12C:
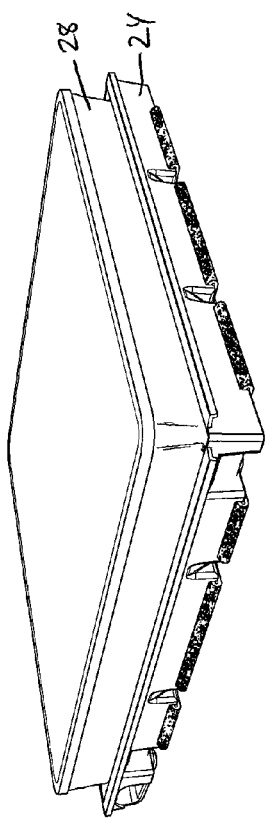

Biodegradable wall 28 includes four wall sections 60 that together define a square shape (when viewed from above), as shown in FIG. 3, for example. Wall 28 is dimensioned to seat within tray 24. Over time the wall sections of wall 28 will bio-degrade and create a semi-continuous soil profile. The height of wall 28 is generally greater than the height of the side walls of tray 24 so that more soil may be contained within wall 28 than the volume defined by tray 24. In some systems, more than one type of wall 28 may be included wherein each type of wall 28 has a different height. This allows for terracing effects to be created on a given roof, such as is shown in FIG. 14. This also allows for more soil to be contained within a given unit, thereby allowing taller vegetation and/or different types of vegetation to be grown in a given unit 20. In some embodiments, the height of wall 28 may be as great as 12 inches. Walls 28 of differing height are shown in FIGS. 12A through 12B. FIGS. 13A through 13B illustrate how the different heights create different depths of soil, thereby allowing different types of vegetation to be grown in the different units 20 having walls 28 of different heights.

Wall 28 includes a flat section 58 defined along the bottom of each wall section 60. (FIG. 3). Flat section 58 is dimensioned such that a relatively large opening is created in the bottom of wall 28. That is, the majority of the bottom of the wall 28 is open space. In this manner, when soil is placed inside of wall 28 while positioned on top of tray 24, most of the soil will rest on top of irrigation mat 26, rather than on flat sections 58. Flat section 58 may be omitted, as would be known to one of ordinary skill in the art.

As shown more clearly in FIG. 2, each of the side walls 40 may include a plurality of mat apertures 56 defined therein for allowing portions of irrigation mat 26 to be inserted therethrough. As was describe above, when mat 26 is inserted through these apertures 56, it may be folded over and this folded orientation may be maintained by one or more fasteners 34 inserted through the folded region of the mat 26 and into the bottom of tray 24. The type of fastener may be any suitable fastener. In one embodiment, the fasteners may be plastic "Christmas tree" like fasteners that are conically ridged in the general shape of a Christmas tree. The ridges or teeth defined on such fasteners prevent the fastener from being pulled back out of the bottom of the tray once they are pushed in. Such fasteners may be inserted manually without the need for a separate tool, such as a screwdriver or the like. Other types of fasteners may, of course, also be used. The fasteners maintain the folded portions of the mat 26 in their folded orientation, which ensures correct positioning of the irrigation mat for guaranteed subsurface capillary connection with adjacent units 20.

Each tray 24 may also include an irrigation channel 62 that provides a space for an irrigation line or hose 64, or other source or subterranean irrigation (FIG. 4). Channel 62 is defined generally between a channel wall 66 and one of the side walls 40 of tray 24 (FIG. 8). A plurality of mat apertures 56 are also defined in channel wall 66 to allow portions of irrigation mat 26 to be inserted therethrough (see FIGS. 2 and 8-9). When water is run through irrigation line 64, the water is expelled from holes or apertures in line 64. Once expelled, the water falls on top of a portion of irrigation mat 26 that has been inserted into irrigation channel 62. Mat 26 thereafter helps spread the water through the entire bottom of tray 24 through the capillary action of mat 26. Further, because of mat 26's physical contact with the mats 26 of neighboring trays, the water delivered to a single tray may be spread to neighboring trays via the capillary contact of the folded over regions of the multiple irrigation mats 26. Stated alternatively, the water delivered to the mat 26 of a single tray may be spread to other trays through the physical contact of the folded over regions of the mats 26. The material of irrigation mat 26 may be made of any wicking type material that is suitable for subterranean use, as would be known to one of ordinary skill in the art.

In some instances, it may be desirable to change the orientation of the tray 24 with respect to the underlying surface on which it is to be installed. Such instances include situations where a roof surface may have undulations or other variations in height. In addition, it may also be desirable to change the height of one or more trays 24 in order to better align them with each so that one or more irrigation lines 64 may be fed through irrigation channels 62 more easily. Tray 24 is designed to allow for such changes in orientation through the use of a plurality of adjustable leveling devices 32. Such leveling devices 32 include a toothed surface 68 defined in bottom wall 38 of tray 24, as well as a physically separable foot 70. In those instances where no height variation is desired, feet 70 may be omitted.

Each foot 70 includes a plurality of teeth 72 that may engage with the bottom of toothed surface 68 of tray 24 at different heights. By changing which teeth of foot 70 engage a given section of toothed surface 68, the height of a corner of tray 24 may be raised or lowered with respect to the other corners of tray 24. Changing the engagement of foot 70 vis-à-vis toothed surface 68 can be accomplished by simply sliding foot 70 either closer to, or further away from, the interior of tray 24. In the embodiment shown, each of the teeth 72 includes a first portion 74 and a second portion 76, and second portion 76 is angled slightly upwardly. This upward angling helps prevent sliding movement of foot 70 relative to tray 24 after tray 24 has been positioned on top of one or more feet 70. This is because the upward angling only allows foot 70 to move away from tray 24 if tray 24 lifts up slightly, which is especially unlikely to happen once the tray is weighted down with the vegetation and soil media.

Tray 24 may also include a plurality of wall mounting apertures 78 that enable tray 24 to be mounted—via screws or other suitable fasteners—to a substantially vertical surface, such as a wall (FIG. 6). Each wall mounting aperture 78 includes a large section 80 and a small section 82. Once a fastener is attached to the wall, or other vertical structure, the tray may be manipulated such that the head of the fastener is inserted through large section 80. Thereafter, the tray is moved down by the weight of gravity into the small section 82. The dimensions of small section 82 may be such that the head of the fastener cannot be removed from small section 82 without first lifting the tray upward such that the fastener head moves into large section 80. In this manner, the tray is releasable locked to the wall, or other nearly vertical surface.

As was noted above, bottom wall 38 may also be shaped to define a pair of handles 36. In the embodiment shown, handles 36 comprise indentations in bottom wall 38 that provide space for a person's fingers to fit when lifting up on tray 24. While only two handles are shown in the embodiment of FIG. 6, it will be understood that more than two handles could be provided, if desired.

Tray 24 may also be constructed to include a plurality of stack ledges 84 (FIG. 15). Stack ledges 84 may be designed to help prevent trays from getting locked together when they are stacked or nested on top of each during shipment, or at other times.

It will be understood by those skilled in the art that multiple different variations of the modular units 20 described herein may be made. A number of alternative embodiments to the trays 24 described herein, as well as other components of units 20, are described in the parent provisional case, U.S. patent application Ser. No. 61/348,023 filed May 25, 2010 entitled Modular Living Roof System, the complete disclosure of which is hereby incorporated herein by reference. Additional modifications beyond those described therein may also be made. As but one example, system 22 could be designed such that the inter-tray capillary action takes place along less than all four sides of a given tray 24. That is, in some embodiments, mat apertures 56 need not be incorporated into all four of the side walls 40 of each tray.

As another variation, the location of irrigation channel 62 could be changed to pass more through the middle of tray 24, rather than along a side of tray 24. Still other locations of irrigation channel 62 could also be implemented. Further, in some systems, irrigation channel 62 could be eliminated altogether, or the use of some trays having an irrigation channel 62 could be combined with the use of some other trays that don't have an irrigation channel, all within the same system. Other variations are also possible.

Figure 11:
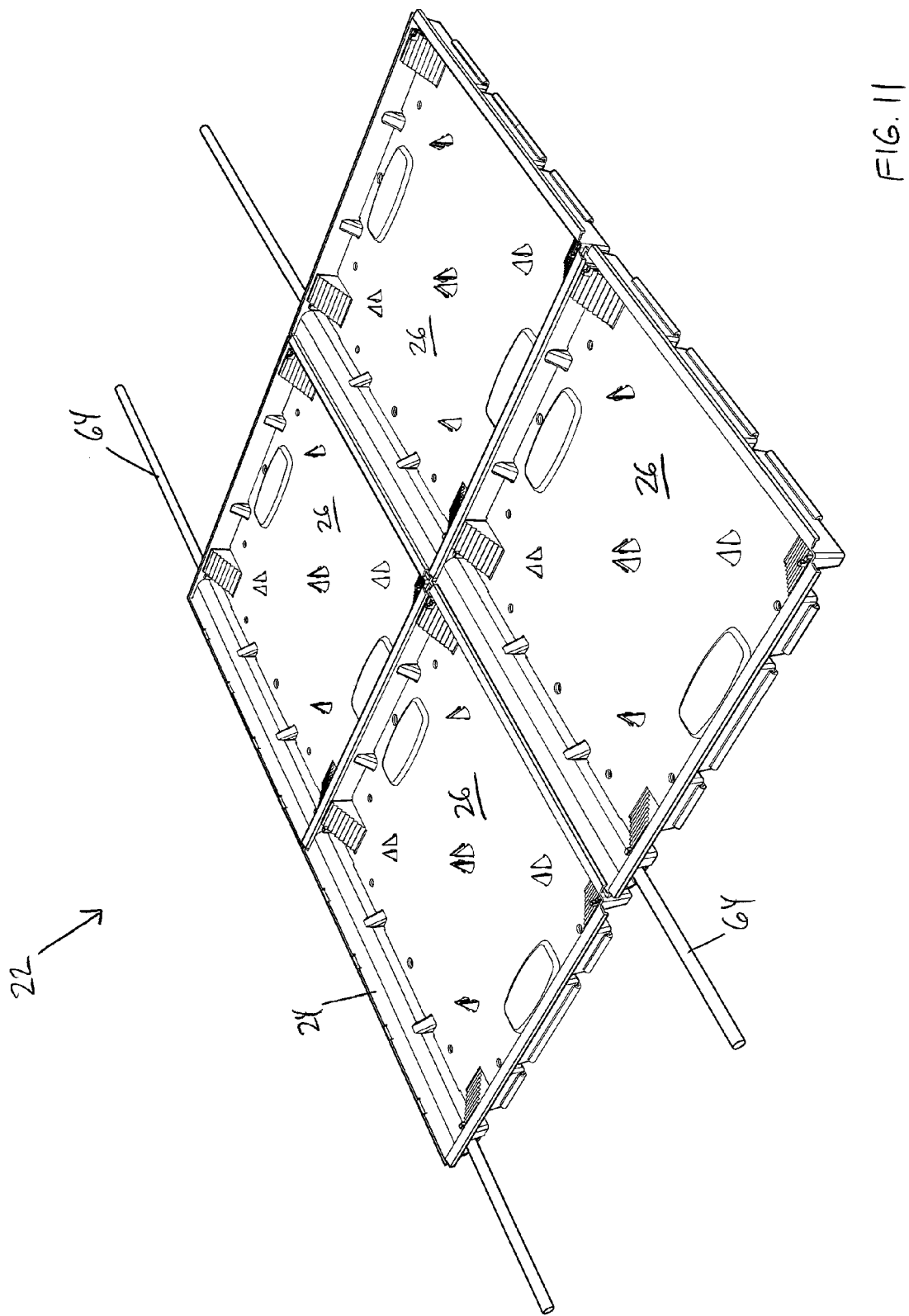
FIG. 11 is a perspective view of a plurality of interconnected trays showing a plurality of subterranean irrigation hoses running therethrough.

It will also be understood that, although FIG. 11 illustrates a portion of a system 22 in which an irrigation line 64 is run through each row of trays 24, it is not necessary to run an irrigation line 64 through each tray 24 for a given green roof installation. This is true because the water supplied by a given irrigation line 64 may be sufficiently spread through the capillary action of mat 26 to neighboring trays such that the neighboring trays receive sufficient water from their neighbors that they do not need their own irrigation line. This may be particularly true for sloped roofs, where an irrigation line may be run through the row of trays 24 at the highest height and the water supplied thereto may be spread down to lower rows through the combined forces of both gravity and the capillary action of mats 26.

It will further be understood that in any of the embodiments described herein, one or more grating units 86 may be added that fit over the tops of the modular units 20 (FIG. 18). Such grates may be made of steel, or other material that is suitably strong for supporting one or more persons who may step or walk on top of the grate. The weight placed on top of the grating unit is transferred to the underlying roof by way of legs 88. Thus, when a person steps on the grating unit, their weight is not borne by modular unit 20. By appropriately placing grating units 86 over selected ones of the modular units 20, portions of a green roof may be suitable for walking or standing upon, or for placing heavy objects upon. The apertures in the grating unit 86 allow moisture and sunlight to get through to the underlying vegetation, thereby helping to sustain the vegetation underneath the grating.

It will also be understood that any suitable borders may be used to surround the plurality of modular units 20 comprising a given installation or system. Such borders may be useful for helping to ensure that the soil does not erode over the edges of the perimeter trays, particularly after the biodegradable wall 28 degrades.

It should be understood that the embodiments shown in the drawings and described above are merely for illustrative purposes, and are not intended to limit the scope of the invention which is defined by the claims which follow as interpreted under the principles of patent law including the doctrine of equivalents.

What is claimed is:
1. A modular green roof apparatus comprising:
 a tray having a bottom and a plurality of sidewalls extending upwardly from said bottom and terminating at a top edge, said tray adapted to support soil in which plants may grow;
 an irrigation channel extending from a first one of said sidewalls to another one of said sidewalls, said irrigation channel defining a space adapted to house an irrigation hose that provides subterranean irrigation to the soil positioned within the tray, a longitudinal side of said irrigation channel being defined by one of the plurality of sidewalls of the tray, and said irrigation channel shielding the space from soil such that water is free to travel downward from the irrigation hose without interference from the soil;
 a wicking mat positionable underneath the soil in said tray and below said top edge of said sidewalls, said wicking mat extending into said irrigation channel such that water delivered by the irrigation hose will be absorbed by said wicking mat and will spread via the wicking mat to an interior of the tray where the wicking mat is in contact with the soil; and an aperture defined within at least one of said plurality of sidewalls, said wicking mat extending through said aperture such that said wicking mat may be placed in physical contact with a second wicking mat from a neighboring tray in order to allow said wicking mat and said second wicking mat to transfer water.

2. The apparatus of claim 1 further including a biodegradable wall supportable within said tray, said biodegradable wall having a height greater than a height of said plurality of sidewalls.

3. The apparatus of claim 2 wherein said biodegradable wall includes four wall sections and a flat section, said flat section adapted to lie on said bottom and support said biodegradable wall, said four wall sections having a perimeter shaped substantially the same as a perimeter defined by said plurality of sidewalls.

4. The apparatus of claim 2 further including first and second planar erosion control members, each said planar erosion control member having a plurality of apertures defined therein, said first and second planar erosion control members adapted to be inserted into said tray with each other in a criss-cross orientation and to resist erosion of soil positioned within said tray while still allowing water to travel through said first and second planar erosion control members.

5. The apparatus of claim 4 further including a plurality of upward supports defined in a bottom of said tray, said plurality of upward supports adapted to hold first and second planar erosion control members in upright orientations.

6. The apparatus of claim 1 further including a plurality of adjustable leveling structures adapted to allow an angular orientation of said bottom of said tray to be adjusted with respect to an underlying roof structure.

7. The apparatus of claim 6 wherein said adjustable leveling structures each include a toothed area defined in said tray and a physically separable support having a toothed surface adapted to engage said toothed area in a plurality of different positions, wherein said different positions define different heights of said tray.

8. The apparatus of claim 1 further including a planar erosion control member having a plurality of apertures defined therein, said planar erosion control member adapted to be inserted into said tray and to resist erosion of soil positioned within said tray while still allowing water to travel through said planar erosion control member.

9. The apparatus of claim 8 wherein said planar member extends from a first corner of said tray to a second corner of said tray.

10. The apparatus of claim 1 further including a hook defined on at least one of said sidewalls, said hook adapted to hook onto a second tray positioned next to said tray to thereby releasably secure said tray and said second tray together.

11. The apparatus of claim 1 further including a plurality of apertures defined in said tray, said apertures including a narrow portion and a wide portion, said apertures adapted to receive fasteners for securing said tray to a wall.

12. The apparatus of claim 1 further including apertures defined in all of said plurality of sidewalls, said apertures positioned to enable said wicking mat to extend therethrough such that said wicking mat may be placed in physical contact with adjacent wicking mats from adjacent trays in order to allow said wicking mats to transfer water.

13. A modular green roof system comprising:
a set of modular green roof apparatuses as set forth in claim 1,
wherein the irrigation hose extends through said irrigation channels in at least some of said set of modular green roof apparatuses, but not all of said set of modular green roof apparatuses, said irrigation hose supplying water for plants growing in said green roof apparatuses.

14. A modular green roof apparatus comprising:
a tray having a bottom and a plurality of sidewalls extending upwardly from said bottom, said tray adapted to support soil in which plants may grow; and
a plurality of adjustable leveling structures adapted to allow an angular orientation of said bottom of said tray to be adjusted with respect to an underlying roof structure, each of said adjustable leveling structures including a toothed area defined in said tray and a physically separable support having a toothed surface adapted to engage said toothed area in a plurality of different positions, wherein said different positions define different heights of said tray.

15. The apparatus of claim 14 further including an aperture defined within at least one of said plurality of sidewalls, said aperture positioned to enable a wicking mat to extend therethrough such that said wicking mat may be placed in physical contact with a second wicking mat from a neighboring tray in order to allow said wicking mat and said second wicking mat to transfer water.

16. A modular green roof system comprising:
a plurality of trays positioned adjacent to each other, each of said trays having a bottom and a plurality of sidewalls extending upwardly from said bottom and terminating at a top edge;
a plurality of biodegradable inserts seated within said plurality of trays, each of said biodegradable inserts including a plurality of wall sections that together define an interior space in which soil is positioned, said wall sections having a height that extends above the top edge of said sidewalls of said trays;
an irrigation channel defined below the top edge of said sidewalls of said tray and outside of the interior space defined by each of said biodegradable inserts, said irrigation channel defining a space for an irrigation line that provides subterranean irrigation to the soil, said irrigation channel being partially defined on a longitudinal side by one of the plurality of sidewalls of the tray, and said irrigation channel shielding the space from soil such that water is free to travel downward from the irrigation line without interference from the soil; and
a wicking mat positioned within said irrigation channel and underneath the soil, said wicking mat adapted to absorb water delivered from the irrigation line and spread the water to the soil.

17. The system of claim 16 wherein said plurality of trays are secured together by way of hooks defined on at least one of said sidewalls of each of said trays, each of said hooks adapted to hook onto an adjacent tray to thereby releasably secure a pair of the trays together.

18. The system of claim 16 wherein each of said plurality of trays includes a plurality of openings defined in said bottom.

* * * * *